United States Patent [19]

Ahle et al.

[11] Patent Number: 4,722,029

[45] Date of Patent: Jan. 26, 1988

[54] VEHICLE HEADLIGHT

[75] Inventors: Bernhard Ahle, Warstein; Hubert Marks, Geseke; Gerd Pokraka; Konrad Schmitz, both of Lippstadt; Josef Sellman, Erwitte; Hermann-Josef Wigger, Lippstadt-Esbeck; Franz Kathmann, Lippstadt, all of Fed. Rep. of Germany

[73] Assignee: Hella HG Hueck & Co., Lippstadt, Fed. Rep. of Germany

[21] Appl. No.: 933,079

[22] Filed: Nov. 20, 1986

[30] Foreign Application Priority Data

Dec. 10, 1985 [DE] Fed. Rep. of Germany ....... 3543563

[51] Int. Cl.$^4$ .............................................. B60Q 1/06
[52] U.S. Cl. .......................................... 362/66; 362/70; 362/80; 362/226; 362/341
[58] Field of Search ........................ 362/66, 37, 44, 61, 362/70, 296, 421, 341, 80, 226; 403/77, 76, 141, 143, 172

[56] References Cited

U.S. PATENT DOCUMENTS

| | | | |
|---|---|---|---|
| 4,306,276 | 12/1981 | Dick | 362/66 |
| 4,607,976 | 8/1986 | Peek et al. | 403/77 |
| 4,621,307 | 11/1986 | Weber | 362/66 |

*Primary Examiner*—Larry Jones
*Attorney, Agent, or Firm*—Max Fogiel

[57] ABSTRACT

The invention concerns a vehicle headlight with a reflector that is made out of a plastic with a high content of filler to increase its thermal stability and that is mounted in an accommodating component in such a way that it can be adjusted around at least one axis consisting of two ball-and-socket like pivot points. The articulating bushing for each ball-and-socket joint is shaped like a sleeve and inserted into a sleeve-shaped extension shaped onto the reflector. The outer surface of the sleeve-shaped articulating bushing is lightly tensioned against the inner surface of the sleeve-shaped extension by means of readily deforming sections. The articulating bushing has at least one resilient snap-in nose mounted radially in relation to the axis of the sleeve on the end of a resilient arm and engaging an undercut in the wall of the sleeve-shaped extension. The resilient arm is longer than the wall of the arm is thick by a multiple factor.

8 Claims, 4 Drawing Figures

VEHICLE HEADLIGHT

The invention concerns a vehicle headlight with a reflector that is made out of a plastic with a high content of filler to increase its thermal stability and that is mounted in an accommodating component in such a way that it can be adjusted around at least one axis consisting of two ball-and-socket like pivot points.

Figure 1:
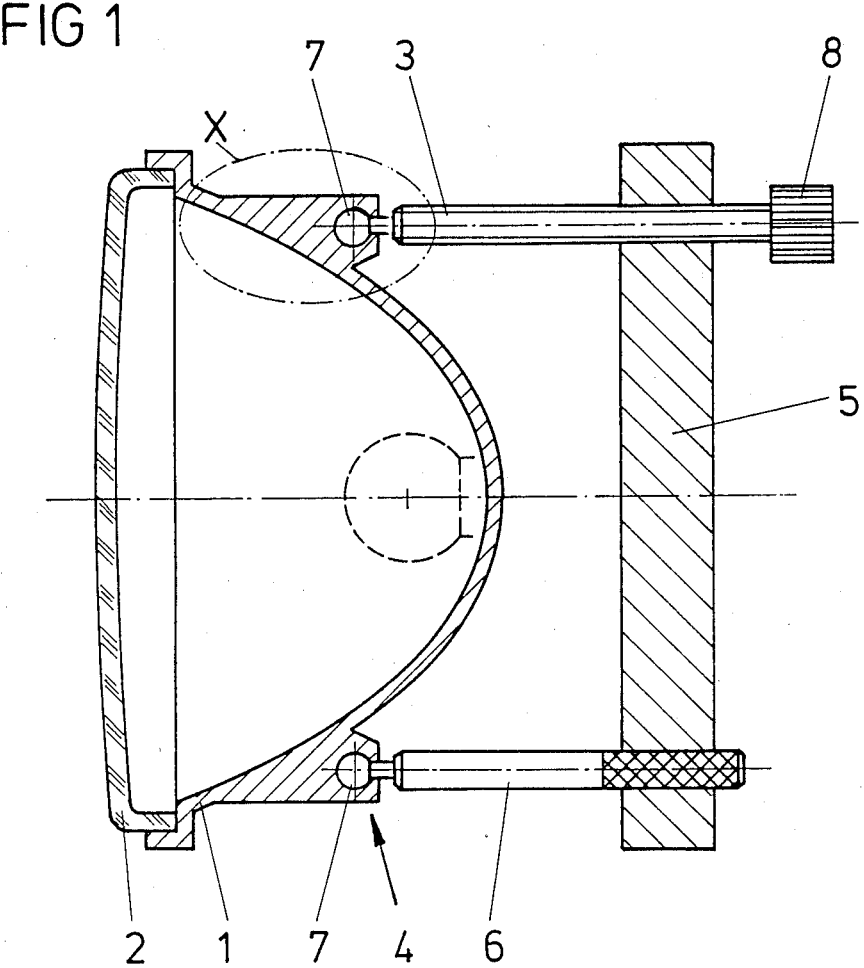
Figure 2:
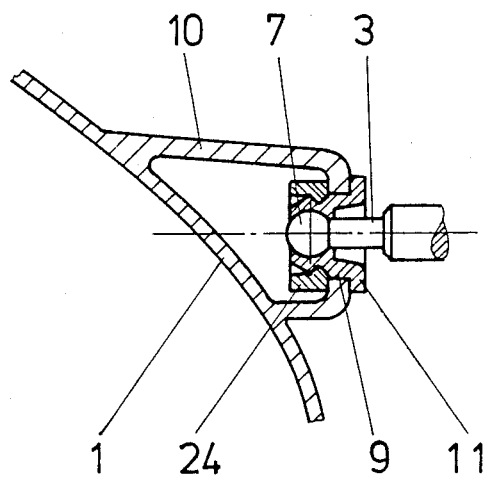

A known headlight of this type is illustrated in FIGS. 1 and 2 of the drawings. The spherical head of the ball-and-socket like pivoting points is machined onto the free end of a set screw that is positioned in such a way that it can be adjusted on the accommodating component and at a stationary point onto the free end of a bolt secured in the accommodating component. The spherical head has been snapped into a sleeve-like articulating bushing. The bushing, which is articulated to the spherical head, has been inserted as far as an outer flange into an opening in a bent section shaped onto the rear of the reflector. An elastic ring has been slid over the section of the sleeve-like articulating bushing that extends through the opening. The ring has been snapped into a groove that extends around the sleeve-like articulating bushing and accordingly secures the sleeve-like articulating bushing in the opening in the bent section. Experience has shown that, since rheology dictates that the bent section of the reflector must be relatively thin-walled, the edges of the opening that accommodates the articulating bushing can break, whereas the brittle plastic that the reflector is made out of can generate enough friction between the spherical bushing and the edge of the opening to impair the reliability of the connection. The additional elastic ring that secures the spherical bushing also make assembling the ball-and-socket like pivot points difficult and time-consuming. Furthermore, adjustable tool components are needed to produce the bent section with the opening that is shaped onto the rear of the reflector.

The object of the invention is to improve the articulating bushing for the ball-and-socket like pivot points of the vehicle headlight generically described herein to the extent that it will reliably secure the spherical head, that it will be reliably secured in an accommodation in the reflector, and that it will be designed such that no powerful radial forces will be exerted on the ball-and-socket accommodation either when the articulating bushing is inserted into the accommodation in the reflector or when the reflector is pivoted. Furthermore, the articulating bushing is to be capable of being inserted easily and rapidly into a ball-and-socket accommodation that is cost-effective to manufacture. This object is attained in accordance with the invention by means of the characteristics that:

(a) the articulating bushing (12) for each ball-and-socket joint is shaped like a sleeve and inserted into a sleeve-shaped extension (13) shaped onto the reflector (1), (b) the outer surface of the sleeve-shaped articulating bushing (12) is lightly tensioned against the inner surface of the sleeve-shaped extension (13) by means of readily deforming sections, (c) the surface of the sleeve-shaped extension (13) that faces opposite the direction that the sleeve-shaped articulating bushing (12) is inserted in functions as a supporting surface for an outer flange (16) on the sleeve-shaped articulating bushing, (d) the articulating bushing (12) has at least one resilient snap-in nose (18) mounted radially in relation to the axis of the sleeve on the end of a resilient arm (17) and engaging an undercut (19) in the wall of the sleeve-shaped extension (13), and (e) the resilient arm (17) is longer than the wall of the arm is thick by a multiple factor.

The sleeve-shaped articulating bushing in an embodiment of this type can, once the spherical head has been inserted into it, be snapped together with the reflector by snapping it into the sleeve-shaped extension. The readily deforming sections on the outer surface of the sleeve-shaped articulating bushing keep the radial forces on the sleeve-shaped extension so weak that no wear will occur between the sleeve-shaped articulating bushing and the brittle-plastic extension on the reflector and that no cracks can occur in the wall of the sleeve-shaped extension. Furthermore, the snap-in nose that engages the undercut in the wall of the sleeve-shaped extension on the reflector can be relatively long, because the spring range of the free end of the resilient arm that the nose is mounted on is relatively long radially.

It is also practical for the inner surface of the sleeve-shaped extension, which sections of the sleeve-shaped articulating bushing rest against, to taper conically in the direction that the sleeve-shaped articulating bushing is inserted in. This makes the seat of the sleeve-shaped articulating bushing in the sleeve-shaped extension very secure. It is also practical for the snap-in nose to be mounted on an arm shaped onto the articulating bushing from outside with at least its terminal section extending approximately parallel to the central axis of the articulating bushing and pointing in the direction that the articulating bushing is inserted in. In an embodiment as simple as this it is practical for the sleeve-shaped articulating bushing to have a groove in its surface that extends in the direction that the articulating bushing is inserted in and that functions as a guide for the snap-in nose when the articulating bushing is inserted into the sleeve-shaped extension. This measure ensures that the snap-in nose will snap into the undercut in the sleeve-shaped extension once the sleeve-shaped articulating bushing has been inserted into the sleeve-shaped extension.

It is also practical for the elastically yielding sections of the sleeve-shaped articulating bushing to be located above and below the area that constitutes the spherical bushing and to consist of continuous rings shaped onto its outer surface and tapering radially. It is very practical for the rings in this embodiment to be triangular in cross-section. An embodiment of this type is very simple and very cost-effective to manufacture. Furthermore, positioning the rings above and below the area that constitutes the spherical bushing distributes the forces on the inside of the sleeve-shaped extension over a large area.

The drawings illustrate both a known vehicle headlight that serves as a point of departure for the invention and the invention itself.

Figure 3:
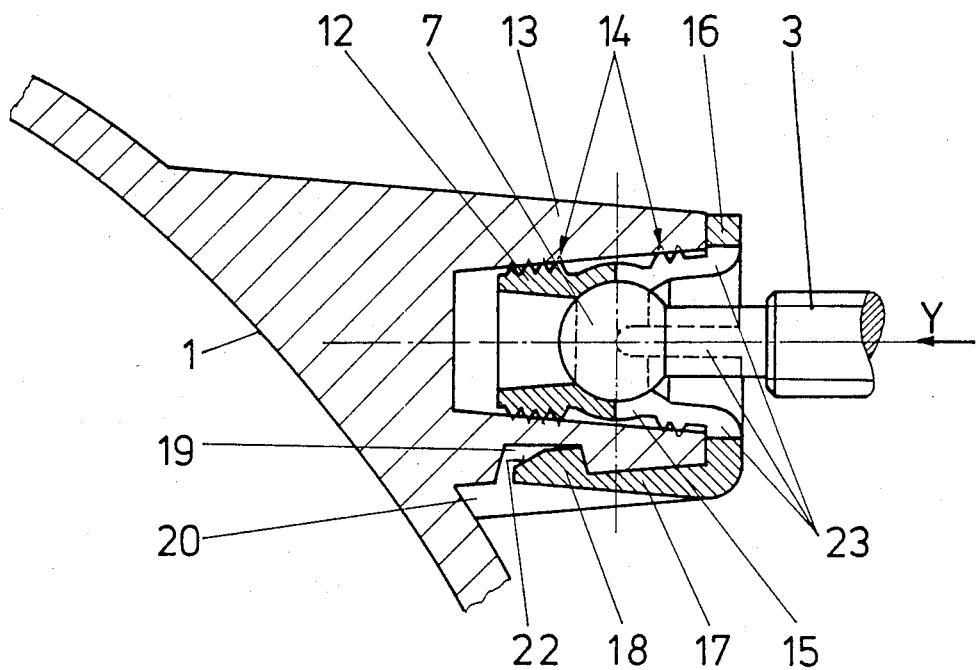
Figure 4:
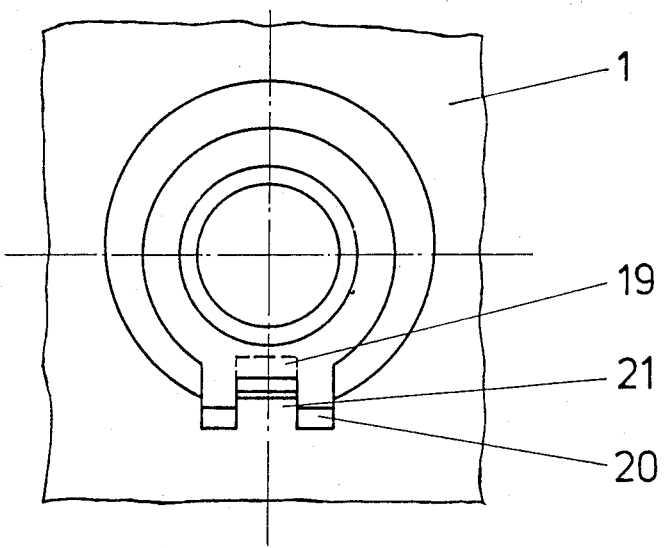

FIG. 1 is a vertical section through a schematically illustrated vehicle headlight with a set screw and stationary point, FIG. 2 is a detail of the area X of the ball-and-socket like pivot point in the known vehicle headlight, FIG. 3 is a detail of the same area X of the ball-and-socket like pivot point in a vehicle headlight in accordance with the invention, and FIG. 4 is a view along the direction Y of the sleeve-shaped reflector extension that functions as an accommodation for the ball-and-socket joint.

The vehicle headlight illustrated schematically in FIG. 1 consists essentially of a cover plate 2 that seals off the inside of a reflector 1 and of two set screws 3 that secure the reflector 1 to an accommodating component 5. Reflector 1 can be pivoted around two mutually perpendicular axes by means of set screws 3. Both pivoting axes extend through a stationary point 4. Set screws 3 can be screwed back and forth in accommodating component 5. Stationary point 4 consists of a bolt 6 and is secured by knurling on one free end, which is inserted tight in an opening in accommodating component 5. The other free end of bolt 6 and the free ends of set screws 3 that point toward reflector 1 all have a machined-on spherical head 7. Each spherical head 7 is inserted in an accommodation in reflector 1 and can be pivoted within it. A knob 8 is mounted on the rear-facing free end of each set screw 3.

The ball-and-socket type pivot point of the known vehicle headlight illustrated in FIG. 2 consists of a sleeve-shaped articulating bushing 9 made out of an elastic plastic snapped over a spherical head 7 machined onto set screw 3 or stationary-point bolt 6. Sleeve-shaped articulating bushing 9 is inserted as far as the outer flange 11 that surrounds it along with spherical head 7 into an opening in a bent section 10 shaped onto the rear of brittle-plastic reflector 1. An elastic ring 24 has been stretched over the part of sleeve-shaped articulating bushing 9 that extends through the opening. The ring snaps automatically into a groove around the sleeve-shaped articulating bushing. The side of ring 24 that faces the direction of insertion presses against the bent section 10 of reflector 1. This measure tensions sleeve-shaped articulating bushing 9 securely in the opening in the bent section 10 of reflector 1.

FIG. 3 illustrates the ball-and-socket pivot point of the vehicle headlight in accordance with the invention. The sleeve-shaped articulating bushing 12 has been inserted into a sleeve-shaped extension 13 shaped onto the brittle-plastic reflector. Sleeve-shaped articulating bushing 12 and a sleeve-shaped extension 13 taper essentially conically along the direction that the articulating bushing was inserted in. Above and below the spherical head 7 of the set screw 3 inserted in sleeve-shaped articulating bushing 12 continuous rings 14 have been shaped around the outer surface of the bushing, their cross-section tapering radially into a triangle in relation to the axis of the bushing. The apexes (represented by broken lines) of the triangular cross-sections of rings 14 are deformed when articulating bushing 12 is inserted into sleeve-shaped extension 13. It will be practical for rings 14 to expand radially once they have deformed to the extent that the convex section constituted by a spherical bushing 15 on the outer surface of sleeve-shaped articulating bushing 12 will not come to rest against the inside of sleeve-shaped extension 13. Thus, only the forces of the relatively readily deforming rings 14 will act on the inside of sleeve-shaped extension 13.

Sleeve-shaped articulating bushing 12 is inserted as far as its surrounding outer flange 16 into extension 13. A resilient arm 17 has been shaped onto the outer flange 16 of sleeve-shaped articulating bushing 12, extending approximately parallel to the central axis of articulating bushing 12 and pointing in the direction that articulating bushing 12 has been inserted in. A snap-in nose 18 has been shaped onto the free end of resilient arm 17, engaging a depression 19 in the outer surface of sleeve-shaped extension 13. On each side of resilient arm 17, ribs are shaped onto the outer surface of sleeve-shaped extension 13, constituting a positioning groove 21 for snap-in nose 18 when articulating bushing 12 is inserted into sleeve-shaped extension 13. Snap-in nose 18 has a slip-on bevel 22 on the end facing the direction that articulating bushing 12 is inserted in.

To make it possible to snap the spherical head into the articulating bushing automatically, slots 23 have been introduced into the wall of the articulating bushing extending from outer flange 16 to spherical bushing 15.

We claim:

1. A vehicle headlight with a reflector comprised of a plastic with a high content of filler to increase the plastic's thermal stability; said reflector being mounted adjustably in an accommodating component; two ball-and-socket like pivot joints, said reflector being adjustable around at least one axis comprised of said two ball-and-socket joints; an articulating bushing for each ball-and-socket joint, said bushing being sleeve-shaped and being inserted into a sleeve-shaped extension shaped onto said reflector; said sleeve-shaped articulating bushing having an outer surface substantially lightly tensioned against an inner surface of said sleeve-shaped extension by readily deforming sections; said sleeve-shaped extension having a surface facing opposite in direction to that in which the sleeve-shaped articulating bushing is inserted; an outer flange on said bushing, said surface on said extension functioning as a supporting surface for said outer flange on said sleeve-shaped articulating bushing; a resilient arm with an end having a sleeve with an axis, said articulating bushing having at least one resilient snap-in nose mounted radially in relation to the axis of said sleeve on the end of said resilient arm and engaging an undercut in a wall of said sleeve-shaped extension; said resilient arm having a wall thickness and length exceeding the wall thickness by a multiple factor.

2. A vehicle headlight as defined in claim 1, wherein said sleeve-shaped extension has an inner surface against which sections of said sleeve-shaped aritculating bushing rest, said inner surface tapering conically in a direction in which said sleeve-shaped articulating bushing is inserted.

3. A vehicle headlight as defined in claim 1, wherein said snap-in nose is mounted on said arm shaped onto said articulating bushing form outside, said arm having at least an end section extending substantially parallel to a central axis of said articulating bushing and pointing in a direction in which said bushing is inserted.

4. A vehicle headlight as defined in claim 3, wherein said sleeve-shaped articulating bushing has a surface with a groove therein, said groove extending in a direction in which said bushing is inserted, said groove functioning as a guide for said snap-in nose when said articulating bushing is inserted into said sleeve-shaped extension.

5. A vehicle headlight as defined in claim 1, wherein said sleeve-shaped articulating bushing has elastically yielding sections located above and below an area comprising a spherical bushing.

6. A vehicle headlight as defined in claim 1, wherein said sleeve-shaped articulating bushings has elastically yielding sections comprising continuous rings shaped onto outer surface of said articulating bushing and tapering radially.

7. A vehicle headlight as defined in claim 6, wherein said rings has a triangular cross-section.

8. A vehicle headlight with a reflector comprised of a plastic with a high content of filler to increase the plastic's thermal stability; said reflector being mounted adjustably in an accommodating component; two ball-and-socket like pivot joints, said reflector being adjustable around at least one axis comprised of said two ball-and-socket joints; an articulating bushing for each ball-and-socket joint, said bushing being sleeve-shaped and being inserted into a sleeve-shaped extension shaped onto said reflector; said sleeve-shaped articulating bushing having an outer surface substantially lightly tensioned against an inner surface of said sleeve-shaped extension by readily deforming sections; said sleeve-shaped extension having a surface facing opposite in direction to that in which the sleeve-shaped articulating bushing is inserted; an outer flange on said bushing, said surface on said extension functioning as a supporting surface for said outer flange on said sleeve-shaped articulating bushing; a resilient arm with an end having a sleeve with an axis, said articulating bushing having at least one resilient snap-in nose mounted radially in relation to the axis of said sleeve on the end of said resilient arm and engaging an undercut in a wall of said sleeve-shaped extension; said resilient arm having a wall thickness and a length exceeding the wall thickness by a multiple factor; said sleeve-shaped extension having an inner surface against which sections of said sleeve-shaped articulating bushing rest, said inner surface tapering conically in a direction in which said sleeve-shaped articulating bushing is inserted; said snap-in nose being mounted on said arm shaped onto said articulating bushing from outside, said arm having at least an end section extending substantially parallel to a central axis of said articulating bushing and pointing in a direction in which said bushing is inserted; said sleeve-shaped articulating bushing having a surface with a groove therein, said groove extending in a direction in which said bushing is inserted, said groove functioning as a guide for said snap-in nose when said articulating bushing is inserted into said sleeve-shaped extension; said sleeve-shaped articulating bushing has elastically yielding sections located above and below an area comprising a spherical bushing.

* * * * *